(12) United States Patent
Highsmith et al.

(10) Patent No.: US 6,705,075 B1
(45) Date of Patent: Mar. 16, 2004

(54) DIGITAL SOLID ROCKET MOTOR AND GAS GENERATOR

(75) Inventors: Thomas K. Highsmith, North Ogden, UT (US); Michael D. Blair, North Ogden, UT (US); Steven R. Wassom, Smithfield, UT (US); William D. Starrett, Roy, UT (US); Joel Dever, Logan, UT (US)

(73) Assignee: Alliant Techsystems Inc., Edina, MO (US)

( * ) Notice: Subject to any disclaimer, the term of this patent is extended or adjusted under 35 U.S.C. 154(b) by 371 days.

(21) Appl. No.: 09/698,472

(22) Filed: Oct. 30, 2000

Related U.S. Application Data
(60) Provisional application No. 60/208,914, filed on Jun. 5, 2000.

(51) Int. Cl.[7] .................................. F02K 9/28
(52) U.S. Cl. ........................... 60/205; 60/253
(58) Field of Search ................ 60/201, 204, 205, 60/250, 253, 39.464

(56) References Cited

U.S. PATENT DOCUMENTS

| 1,191,299 A | 7/1916 | Goddard |
|---|---|---|
| 1,194,496 A | 8/1916 | Goddard |
| 1,206,837 A | 12/1916 | Goddard |
| 2,945,344 A | 7/1960 | Hutchinson |
| 2,956,401 A * | 10/1960 | Kane ........................ 60/250 |
| 2,987,881 A | 6/1961 | Mullane |
| 3,043,105 A | 7/1962 | Hagerty |
| 3,073,113 A | 1/1963 | Faught |
| 3,457,726 A | 7/1969 | Trotel |
| 4,011,720 A | 3/1977 | Kirschner, Jr. |
| 4,766,726 A | 8/1988 | Tackett et al. |
| 4,956,971 A | 9/1990 | Smith |
| 5,160,070 A * | 11/1992 | Hibler et al. ................ 60/250 |
| 5,345,758 A | 9/1994 | Bussing |
| 5,353,588 A | 10/1994 | Richard |
| 5,473,885 A | 12/1995 | Hunter, Jr. et al. |
| 5,506,588 A | 4/1996 | Diefes et al. |
| 5,513,489 A | 5/1996 | Bussing |
| 5,534,875 A | 7/1996 | Diefes et al. |
| 5,546,744 A | 8/1996 | Winfree et al. |
| 5,557,926 A | 9/1996 | Hunter, Jr. et al. |
| 5,579,633 A | 12/1996 | Hunter, Jr. et al. |
| 5,608,183 A | 3/1997 | Barnes et al. |
| 5,615,548 A | 4/1997 | Winfree et al. |
| 5,672,184 A | 9/1997 | Hunter, Jr. |
| 5,855,827 A | 1/1999 | Bussing et al. |
| 5,864,517 A | 1/1999 | Hinkey et al. |
| 5,873,240 A | 2/1999 | Bussing et al. |
| 5,901,550 A | 5/1999 | Bussing et al. |
| 5,937,635 A | 8/1999 | Winfree et al. |
| 6,003,301 A | 12/1999 | Bratkovich et al. |

* cited by examiner

Primary Examiner—Ehud Gartenberg
(74) Attorney, Agent, or Firm—TraskBritt (57) ABSTRACT

A method and device for producing a controlled combustion by placing a combustion chamber in communication with a feed chamber that contains a solid propellant/body, introducing at least a portion of the body into the combustion chamber, isolating the combustion chamber from the feed chamber, and igniting the solid propellant in the combustion chamber while the combustion chamber is isolated from the feed chamber.

19 Claims, 9 Drawing Sheets

DIGITAL SOLID ROCKET MOTOR AND GAS GENERATOR

This application claims the benefit of priority of provisional patent application No. 60/208,914 filed in the U.S. Patent & Trademark Office on Jun. 5, 2000.

BACKGROUND OF THE INVENTION

The present invention relates to propulsion and gas generating systems which utilize solid fuel.

In the current state of the art, either liquid or solid fuel, or propellant, is used in propulsion systems. Liquid fuel can easily be introduced at a controlled rate into a combustion chamber in order to allow the propulsion energy level to be adjusted in a simple manner. In addition, combustion can be halted and restarted simply by stopping and restarting the flow of liquid fuel into the combustion chamber.

However, liquid fuels tend to be relatively toxic, creating both storage and environmental safety problems, as well as some risk of destructive malfunction of the propulsion system in which they are employed. Furthermore, known liquid propellants have a lower energy density than do solid propellants.

However, solid propellants, despite their inherent advantages, do not lend themselves to controllable propulsion requirements or to controlled shut-off when intermittent propulsion is desired.

BRIEF SUMMARY OF THE INVENTION

The present invention provides an improved method of producing a controlled combustion, comprising: placing a combustion chamber in communication with a feed tube or chamber that contains a solid propellant body; introducing at least a portion of the body into the combustion chamber; isolating the combustion chamber from the feed chamber; and igniting the solid propellant in the combustion chamber while the combustion chamber is isolated from the feed chamber.

The invention further provides a novel device for producing a controlled combustion, comprising: a combustion chamber; a feed chamber containing a solid propellant; an outlet from the combustion chamber in communication with either a nozzle or an accumulator; an igniter communicating with the combustion chamber; and displacement means coupled to one of the chambers for establishing a first position in which the combustion chamber in communication with the feed chamber to allow at least a portion of the solid propellant to be introduced into the combustion chamber, and a second position in which the combustion chamber is isolated from the feed chamber and in communication with the outlet nozzle.

DETAILED DESCRIPTION OF THE INVENTION

The present invention essentially provides methods and devices for producing thrust, or a quantity of gas under pressure, in throttleable, controllable amounts, using solid propellants. The invention takes advantage of the realization that higher fuel consumption efficiency is obtained in chemical propulsion systems by the production of high pressure, high thrust, short duration pulses, as opposed to thrust forces produced by continuous, or long duration, combustion. Devices according to the invention can be constructed to have a reduced inert weight and increased mass fraction, in comparison with liquid propellant systems having similar performance characteristics. Devices according to the invention can be constructed in ways that allow extremely simple introduction of successive bodies of solid propellant into the combustion chamber.

Figure 1:
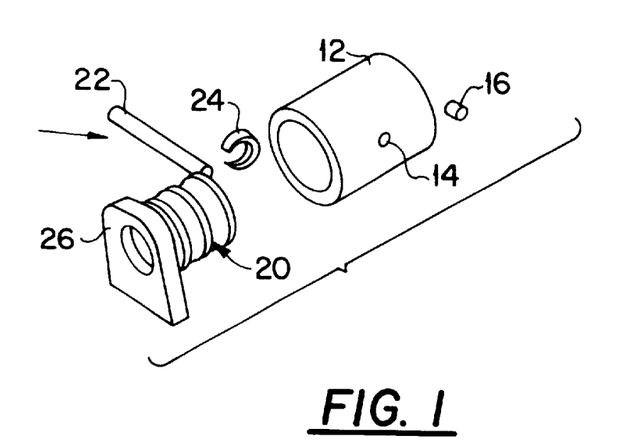
FIG. 1 is a perspective view of the basic components of a first embodiment of a device according to the invention, with the component parts disassembled to facilitate viewing.
Figure 2A:
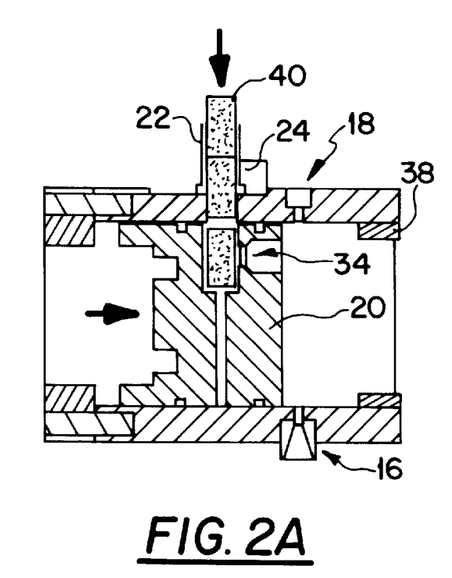
FIGS. 2A and 2B are simplified pictorial cross-sectional views showing the device of FIG. 1 in an assembled state and in two respective operating states.
Figure 2B:
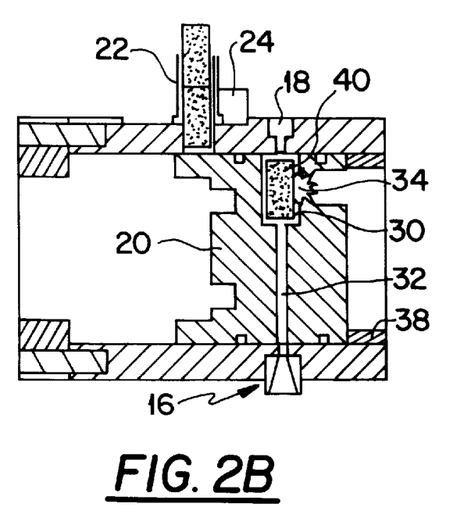

One example of a device according to the invention is illustrated in FIGS. 1, 2A and 2B. This embodiment is composed essentially of a hollow cylindrical housing 12 having a lateral opening 14 that receives an outlet nozzle 16 and a further opening (not visible in FIG. 1) for introduction of solid propellant into a combustion chamber. Housing 12 may also be provided, at a point diametrically opposite opening 14, with a pressure transducer port 18 in which a pressure transducer will be installed before the device is placed into operation, thereby blocking port 18.

The device further includes a cylindrical combustion chamber housing 20 which contains the combustion chamber, a feed tube 22 and a support element 24 which holds feed tube 22 in place on housing 12, in line with the propellant introduction opening provided in the cylindrical wall of housing 12.

The device shown in FIG. 1 further includes a mounting member 26 that will be secured to one end of housing 12 and will serve to mount the device on any suitable support surface within an air, ground, or space vehicle, including, but not limited to, an aircraft, missile, spacecraft, automobile, personnel carrier, in which the device is to serve as a gas generator or propulsion motor particularly for station keeping and attitude adjustment.

Referring specifically to FIGS. 2A and 2B, combustion chamber housing 20 is formed to include a combustion chamber 30, a combustion gas outflow path 32 and an igniter housing 34. In a complete device, housing 34 will contain an igniter that seals housing 34 to prevent escape of combustion gas therethrough.

In the embodiment shown in FIGS. 1 and 2, housing 20 is movable in translation along the longitudinal axis of housing 12 between a propellant loading position shown in FIG. 2A and a propellant combustion position shown in FIG. 2B. This movement is controlled by a suitable displacement mechanism (not shown) that can be constructed and operated according to techniques already known in the art. Optionally, housing 12 may be provided with stop element, 38 which helps to assure that housing 20 will be correctly placed in the propellant combustion position.

At the start of a propulsion cycle, housing 20 is in the position shown in FIG. 2A, with propulsion chamber 30 in line with the propellant introduction opening in housing 12 and with feed tube 22. Feed tube 22 is coupled to a propellant storage device (not shown) having any desired size and shape. In the embodiment illustrated in FIGS. 1 and 2, the propellant is in the form of discrete bodies, or charges, 40, each dimensioned to fit into combustion chamber 30 in a desired manner. This may involve dimensioning a body 40 to substantially completely fill combustion chamber 30, or to fill a defined portion thereof. Each body 40 may be a homogeneous body made entirely of a combustible material or may be composed of a mass of a combustible material held in a casing which is itself made of a combustible material so that the entire body will be consumed upon being ignited. After a body 40 has been introduced into chamber 30, housing 20 will be displaced in the direction of the arrow shown in FIG. 2A and by the displacement mechanism into the position shown in FIG. 2B. Combustion chamber 30 is then isolated from the propellant introduction opening and is in communication with pressure transducer port 18, while path 32 is aligned, and in communication, with nozzle 16.

An igniter inserted in housing 34 may then be actuated to ignite body 40, producing combustion gases that travel through path 32 and are expelled via nozzle 16 to generate a thrust pulse.

The sequence illustrated in FIGS. 2A and 2B can be repeated at a desired rate, which can be up to several times per minute or faster, depending on the mechanisms employed. The duration of each thrust pulse will depend on the size and composition of each propellant body 40. By varying the cycle rate, any level of average propulsion force can be produced.

Propellant bodies 40 can have the form of cubes, cylinders, spheres, etc.

As an alternative to the provision of a plurality of discrete bodies 40, there can be provided a continuous rod of propellant material whose leading end is fed into combustion chamber 30, after which movement of chamber 20 into the position shown in FIG. 2B will act to sever the portion of the propellant material rod which is then in chamber 30 from the remainder of the rod. This simply requires that the end of chamber 20 which traverses the propellant introduction opening between tube 22 and chamber 30 be provided with, or shaped to function as, a suitable cutting tool. In the case of this embodiment, the distance through which the rod of propellant material is advanced at the start of each propulsion cycle will control the amount of propellant material which is present in chamber 30 when ignition occurs, i.e., in the position shown in FIG. 2B, thereby providing an additional control parameter for the generation of propulsion forces.

Figure 3A:
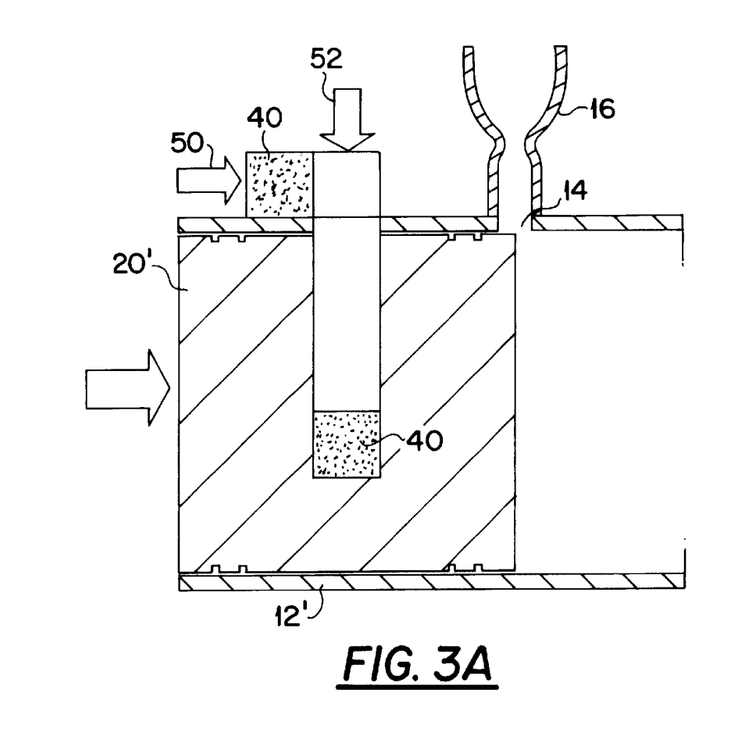
FIGS. 3A and 3B are views similar to that of FIGS. 2A and 2B showing a modified version of the device of FIG. 1 in two respective operating states.
Figure 3B:
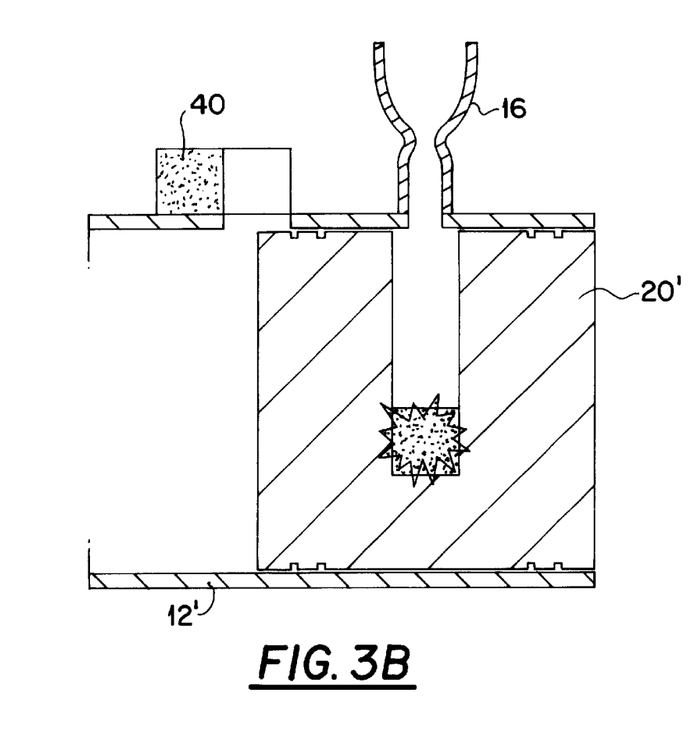

FIGS. 3A and 3B are views similar to those in FIGS. 2A and 2B illustrating a second form of construction of an embodiment having the general configuration shown in FIG. 1. The embodiment shown in FIGS. 3A and 3B differs from that of FIGS. 2A and 2B in that nozzle 16 is disposed at the same side of the longitudinal axis of housing 12' as the opening via which solid propellant bodies 40 are introduced into the combustion chamber. Therefore, combustion chamber housing 20' does not have a passage corresponding to passage 32 in the embodiment of FIGS. 2A and 2B. Housing 12' may be provided with a suitably located pressure transducer port corresponding in function to port 18 of FIGS. 2A and 2B and would be provided with an igniter, although this is not illustrated in FIGS. 3A and 3B.

According to a further variation, bodies 40 may be brought into position with the opening for introduction into the combustion chamber by first being moved in a direction 50 parallel to the longitudinal axis of housing 12', and then in a direction 52 perpendicular to direction 50.

In all other respects, the embodiment shown in FIGS. 3A and 3B is constructed and operated in the manner described above with respect to FIGS. 2A and 2B.

Figure 4:
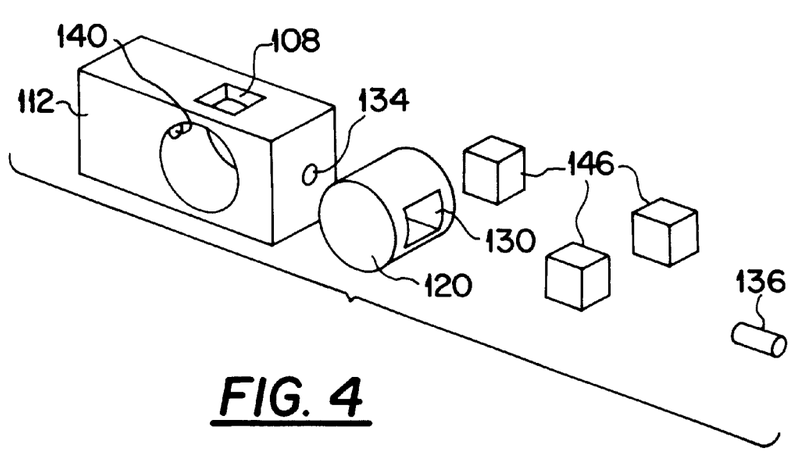
FIG. 4 is a view similar to that of FIG. 1 showing another embodiment of a device according to the invention.
Figure 5A:
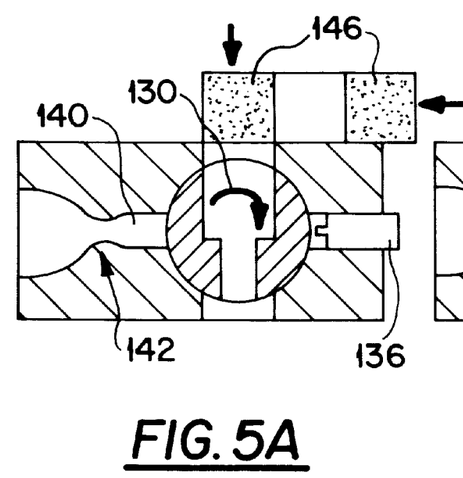
FIGS. 5A and 5B are cross-sectional views similar to those of FIGS. 2A and 2B, relating to the embodiment of FIG. 4.
Figure 5B:
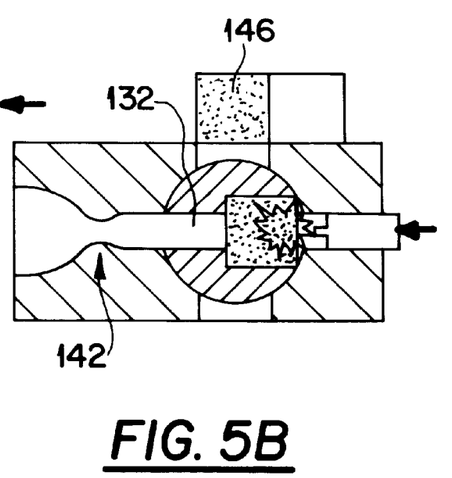

FIGS. 4, 5A and 5B show a second embodiment of a device according to the invention which differs from the first embodiment essentially in that it includes a combustion chamber housing that is rotatable, rather than being movable in translation.

The device according to this embodiment is composed essentially of a rectangular housing 112 provided with a passage in the form of a cylindrical through bore which is open at two opposite sides of housing 112. In addition, housing 112 is provided with a rectangular propellant inlet opening 108, a passage 134 defining a housing for receiving an igniter 136, and a combustion gas outlet passage 140 that opens into a nozzle 142 (not visible in FIG. 4). The through bore in housing 112 receives a circular cylindrical combustion chamber housing 120 provided with a rectangular, or parallelepiped shaped, combustion chamber 130 and a passage 132 which is arranged to communicate with gas outlet passage 140 when combustion chamber housing 120 is in an ignition position.

In this embodiment, the propellant is in the form of essentially cubic bodies 146 that will be introduced in succession into combustion chamber 130 and will then be ignited. Any desired type of mechanism can be provided to supply propellant bodies 146 to combustion chamber 130 at a desired rate. Alternatively, the propellant can initially be in the form of a rod having a square cross section and housing 112 can be provided with a suitable device for severing the leading end of the rod to form a discrete propellant body that is introduced into chamber 130 for each combustion event.

The device according to this embodiment operates in much the same way as the embodiment of FIGS. 1 and 2, with the exception that here combustion chamber housing 120 is rotated between a loading position, shown in FIG. 5A, and an ignition position, shown in FIG 5B. In the loading position of FIG. 5A, a propellant body 146 can be introduced into chamber 130 by any suitable mechanism. Then, housing 120 is rotated to the ignition position shown in FIG 5B, in which passage 132 is aligned with passage 140 and igniter 136 is in position to cause ignition of propellant body 146. With the device in the position shown in FIG. 5B, the propellant body in chamber 130 is ignited by actuation of igniter 136, producing combustion gasses that pass through passage 132 and passage 140 and are then expelled via nozzle 142 in order to produce a thrust pulse.

As in the case of the embodiments shown in FIGS. 1, 2 and 3, thrust pulses can be produced at any desired rate within the capabilities of the propellant body feed mechanism and combustion chamber housing rotation mechanism.

A third embodiment of the invention is shown in FIGS. 6A, 6B, 7A and 7B and includes a circular cylindrical housing 212 and a circular disc-shaped combustion chamber housing 220. Housing 220 is installed in housing 212 and is connected to a suitable drive system (not shown) to rotate housing 220 within, and about the longitudinal axis of, housing 212.

Housing 212 is provided with a propellant introduction opening 208 and four nozzles 216, spaced at intervals of 90° about the periphery of housing 212. Housing 220 is provided with four combustion chambers 230 spaced at intervals of 90° about the periphery of housing 220. In the illustrated embodiment, each chamber 230 has a square cross section and the device operates with propellant bodies 240 each having a cubic form. In the operation of this embodiment, each combustion chamber 230 receives a propellant body 240 when that chamber is in alignment with propellant introduction opening 208. Housing 220 can be rotated by a suitable mechanism in the direction of the arrow shown in FIG. 7A and each combustion chamber 230 is provided with an igniter (not shown) which can be actuated at any time when the associated chamber 230 is isolated from introduction opening 208. Thus, a propellant body 240 in any one of combustion chambers 230 can be ignited when its associated combustion chamber is in line with any selected one of nozzles 216, or before the associated combustion chamber comes into alignment with the respective nozzle. In the latter case, as shown particularly in FIG. 7B, a propellant body can be ignited when its associated combustion chamber 230 is completely sealed so that a mass of combustion gasses under pressure accumulates in the associated combustion chamber. Then, when housing 220 is rotated to bring the combustion chamber into alignment with a respective nozzle 216, the combustion gasses will be expelled through the nozzle to produce a thrust pulse.

Figure 6A:
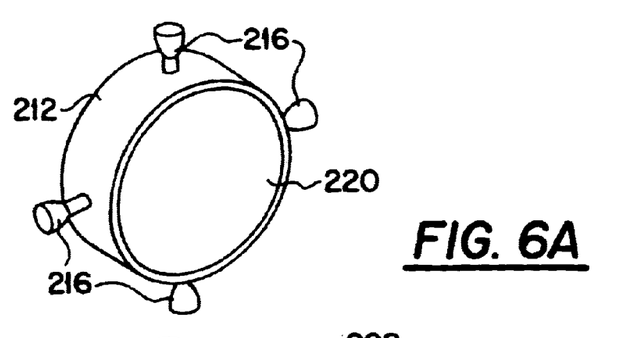
FIGS. 6A and 6B are assembled and disassembled, respectively, perspective views of a further embodiment of a device according to the invention.
Figure 6B:
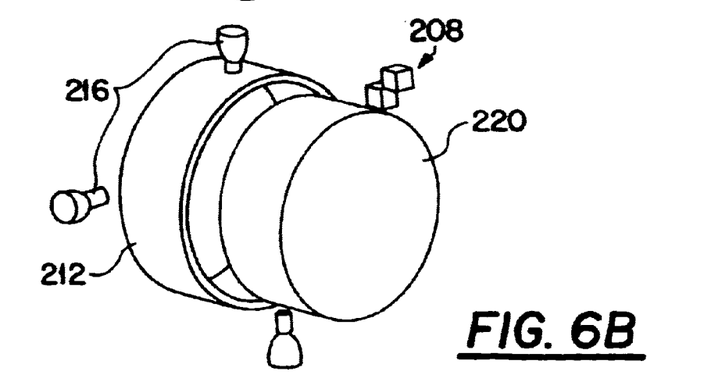
Figure 7A:
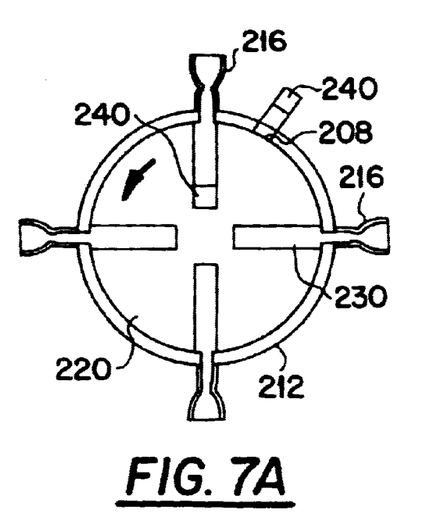
FIGS. 7A and 7B are views similar to those of FIGS. 2A and 2B relating to the embodiment of FIGS. 6A and 6B.
Figure 7B:
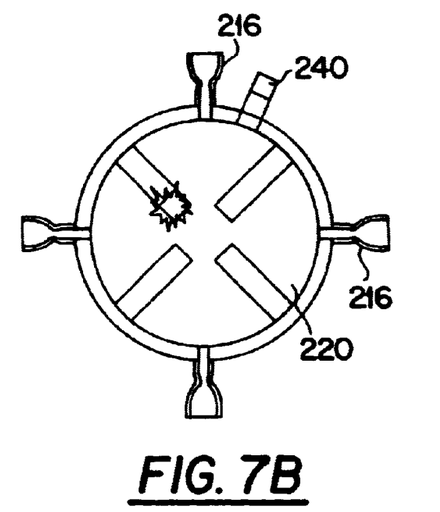

Thus, the embodiment shown in FIGS. 6 and 7 can be operated to produce thrust pulses in any one of four different directions.

In a variant of the embodiment shown in FIGS. 6 and 7, a different number of combustion chambers 230 can be provided. This number can be between one and a number greater than four. As the number of combustion chambers 230 is increased, the rate at which thrust pulses can be produced and the possible number of thrust directions increase correspondingly.

The invention can also be embodied in a device having a fixed combustion chamber housing, a movable shutter mechanism for sealing the combustion chamber off from the feed tube prior to a combustion phase and a single nozzle that is in permanent communication with the combustion gas outflow path. The nozzle can either be fixed to the combustion chamber housing or can be gimbaled relative thereto.

The embodiments shown in FIGS. 4–7 can be easily modified so that the associated combustion chamber housing is displaced in translation, rather than in rotation.

Another embodiment of the invention is illustrated in FIGS. 8A, 8B, 9A and 9B. As will be seen, this embodiment differs from that of FIGS. 6 and 7 in that the direction of introduction of propellant bodies in a direction in which thrust is produced are parallel to the axis of rotation of the combustion chamber.

The embodiment shown in FIGS. 8A, 8B and 9A, 9B includes a device housing 312 composed essentially of a base plate 314 and a cover 316. A combustion chamber housing 320 is installed within housing 312 and includes a plate member 322 and a stem or shaft, 324. Plate member 322 and shaft 324 formed as a one piece unit and shaft 324 extends through a hub forming a part of cover 316. A shaft 324 is provided, at its upper end, with a coupling element 326 that can be coupled to any suitable drive mechanism (not shown) to rotate combustion chamber housing 320 about the longitudinal axis of shaft 324.

Figure 8A:
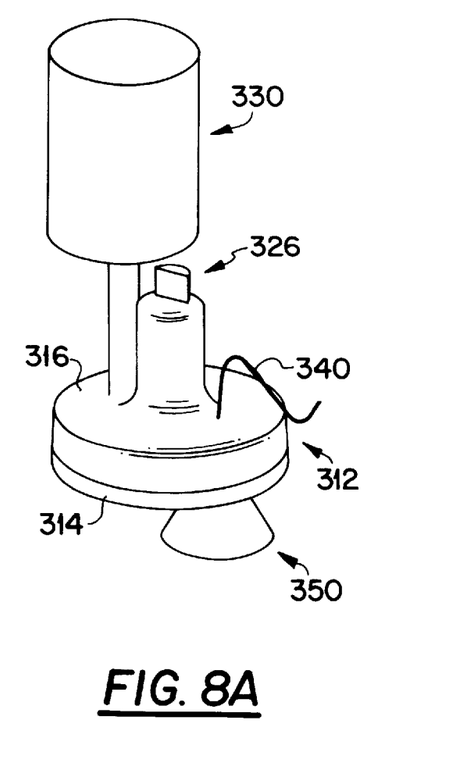
FIGS. 8A and 8B are, respectively, an assembled perspective view and an exploded perspective view of another embodiment of a device according to the invention.
Figure 8B:
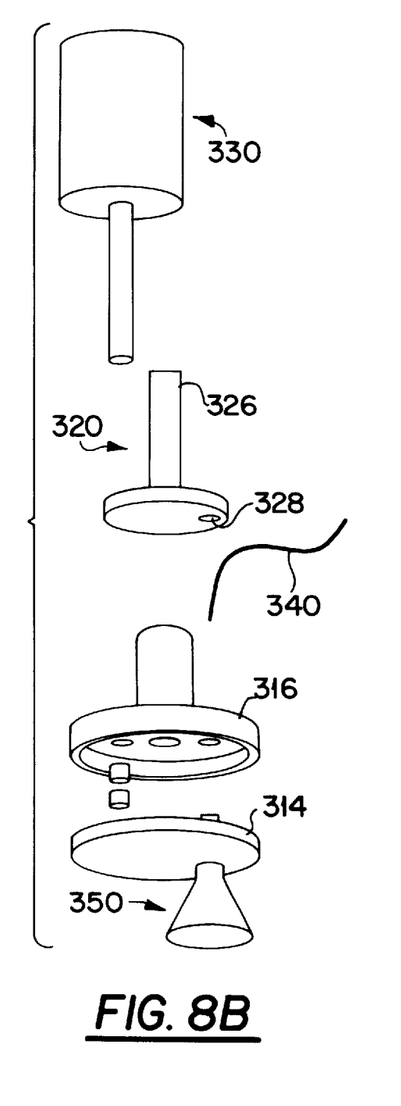

Combustion chamber housing 320 is provided with one or more combustion chambers 328.

This embodiment further includes a feed unit 330 composed of a magazine 332 for storing a supply of propellant bodies 40 and a feed tube 334 which extends between magazine 332 and an introduction opening provided in cover 316 in order to supply individual bodies 40 in succession to chamber or chambers 328. Feed unit 330 can be constructed in any suitable conventional manner to reliably deliver a succession of propellant bodies 40 to combustion chamber or chambers 328.

The unit is completed by an igniter 340 that communicates with a recess 342 provided in cover 316.

Finally, plate 314 is provided with a propellant gas outlet passage coupled to a nozzle 350.

In operation, combustion chamber housing 320 is rotated, by operation of a mechanism coupled to element 326, to bring a combustion chamber 328 into line with feed tube 334 and to allow a propellant body 40 to be introduced into that combustion chamber. Combustion chamber housing 320 is then rotated to bring a combustion chamber 328 containing a body 40 into line with the combustion gas outlet passage coupled to nozzle 350, as well as into line with igniter 340. Igniter 340 can then be activated to ignite body 40 and produced a thrust pulse.

Figure 9A:
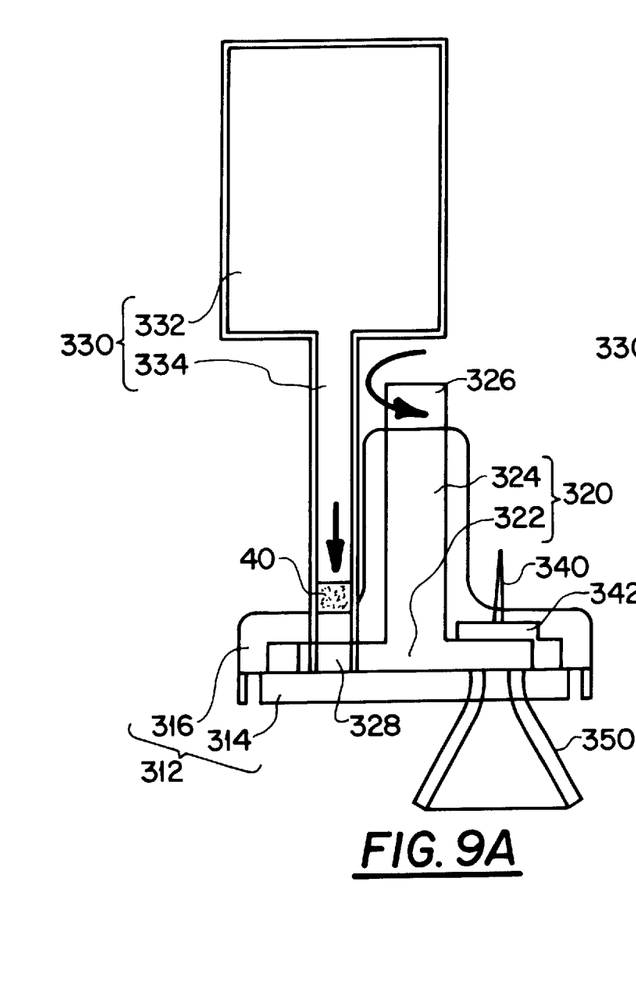
FIGS. 9A and 9B are cross-sectional views similar to those of FIGS. 2A and 2B, relating to the embodiment of FIGS. 8A and 8B.
Figure 9B:
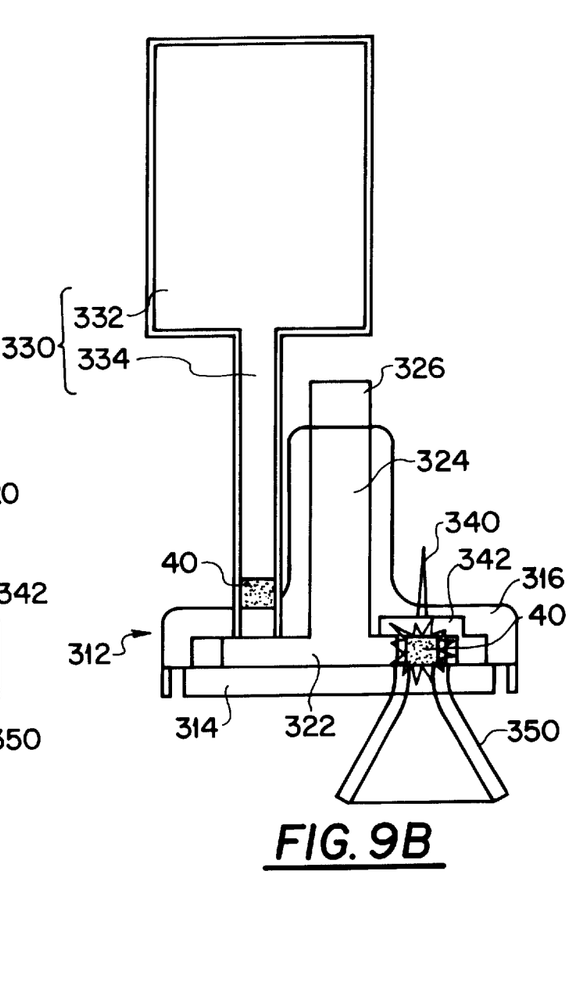

If combustion chamber housing 320 is provided with a plurality of combustion chambers 328, spaced angularly from one another about the axis of rotation of shaft 324, each combustion chamber 328 will receive a propellant body 40 in turn, shown in FIG. 9A, and will subsequently be brought to the position shown in FIG. 9B, where propellant body 40 is ignited.

It will be noted that one feature of the present invention is that the direction of introduction of a propellant body 40 into a combustion chamber 328 and the direction of each thrust pulse are parallel to one another and to the axis of rotation of shaft 324. Furthermore, in all of the embodiments disclosed herein, combustion chamber housing is movable relative to the device housing so that the, or each, combustion chamber undergoes a rotary or transverse linear motion relative to the above-mentioned directions of introduction and of each thrust pulse to isolate the combustion chamber from the exit nozzle or accumulator during introduction of a propellant body 40 and to isolate the combustion chamber from the feed unit when a thrust pulse is being produced.

Various types of igniters can be used in any of the embodiments of the present invention. A suitable igniter could be, for example, a simple impact-type firing pin that would cooperate with a consumable primer embedded in the propellant body at a location to be aligned with the firing pin when the body is in a combustion chamber and the combustion chamber is in a position at which ignition is to occur. Use may also be made of capacitor discharge and laser igniters.

The functions of propellant feed and combustion chamber housing displacement may be performed by separate systems, including stepper or servo motors, solenoids, etc. These mechanisms, and ignition, can be controlled by a suitable computerized control system to determine the exact timing and sequence of functions. Such a control system can easily be implemented by those skilled in the art. It should also be apparent that some or all of the various functions can be combined with the use of mechanical linkages and/or springs.

As an alternative to achieving ignition of a propellant body when the combustion chamber is in communication with a nozzle, combustion can occur when the combustion chamber is in communication with an accumulator which could store a quantity of combustion exhaust gas and subsequently distribute that gas through valves for the performance of various functions, including the production of thrust pulses, the driving of miniature turbo-alternators for electrical energy, or for feeding fuel-rich effluent to a pulse detonation engine or other air breathing engine.

In addition, as already described above with respect to the embodiment of FIGS. 6 and 7, combustion can occur while the combustion chamber is completely sealed and the resulting exhaust gasses under pressure can be released either to a nozzle or to an accumulator.

Figure 10:
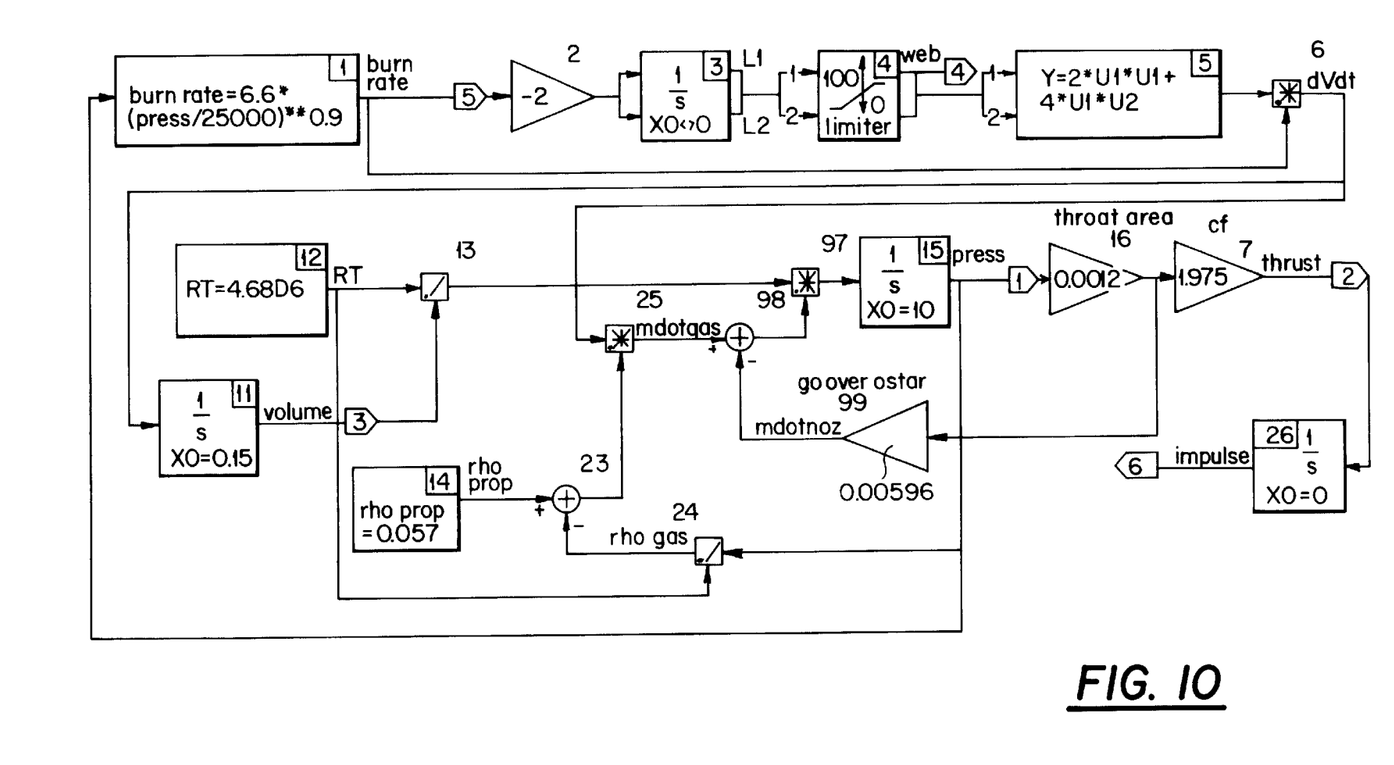
FIG. 10 is a mathematical model of an exemplary embodiment of a device according to the invention.

FIG. 10 shows a mathematical model of a device according to the invention.

Table 1, below, lists the propellant properties that were assumed in developing that model.

TABLE 1

Propellant Parameters for Ballistic Model

| | |
|---|---|
| Burn rate equation (in/sec) | 6.6 $(P/25000)^{0.9}$ |
| Propellant Impetus (RT) | 1164 J/g |
| Flame Temperature | 3475 K. |
| Propellant Density | 1.573 g/cc |
| Ratio of Specific Heats | 1.238 |
| Characteristic Velocity | 5403 ft/sec |
| Molecular Weight | 24.76 |

Figure 11:
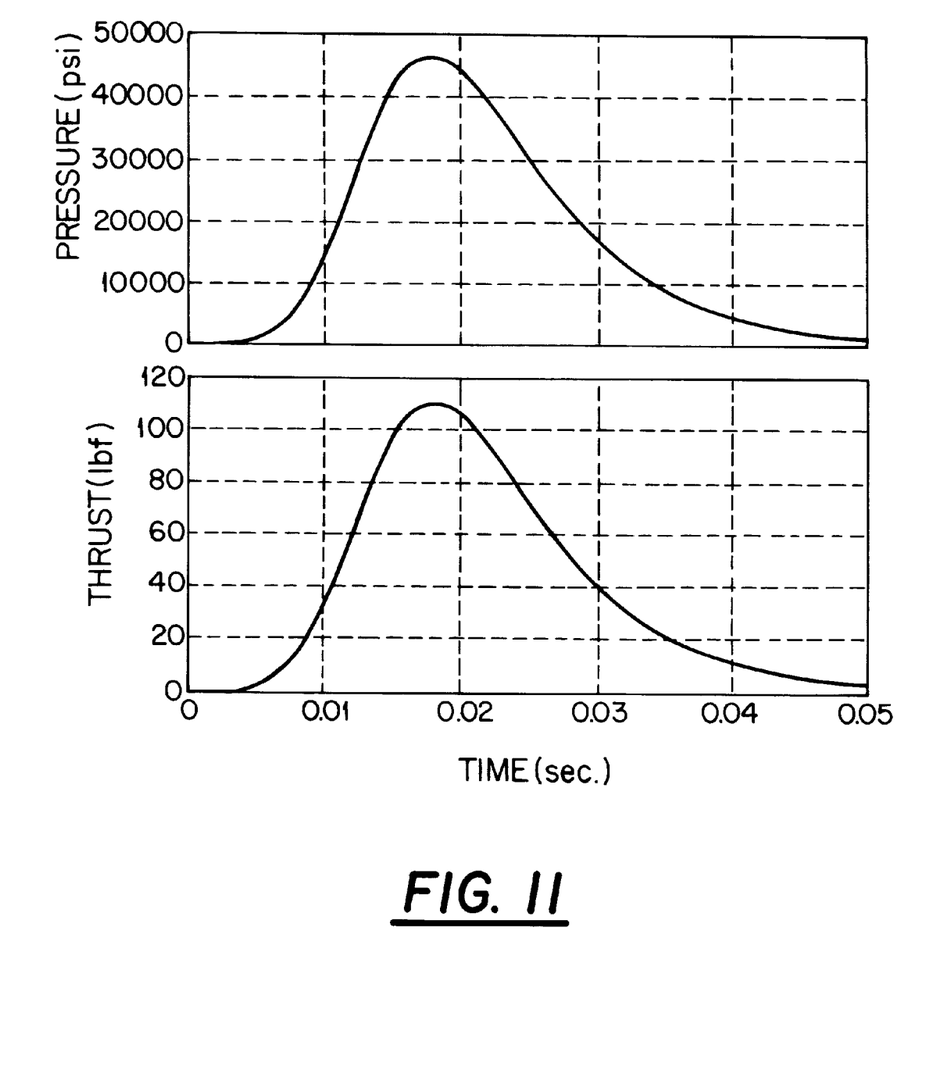
FIG. 11 provides diagrams of thrust and pressure versus time of transient ballistics in the operation of a first example of a device according to the invention.

Table 2, below, shows the resulting geometry for a 100-lbf thruster and FIG. 11 shows the form of the pressure and thrust pulses that will be produced in a device according to the mathematical model of FIG. 10, using the dimensions set forth in Table 2.

TABLE 2

Geometry for 100-lbf Thruster

| | |
|---|---|
| Dimensions of cube | 0.354 in. × 0.354 in. × 0.827 in. |
| Initial free volume | 0.15 $in^3$ |
| Throat Diameter | 0.0391 in. |
| Expansion Ratio | 500:1 |
| Vacuum Thrust Coeff. | 1.975 |

Figure 12:
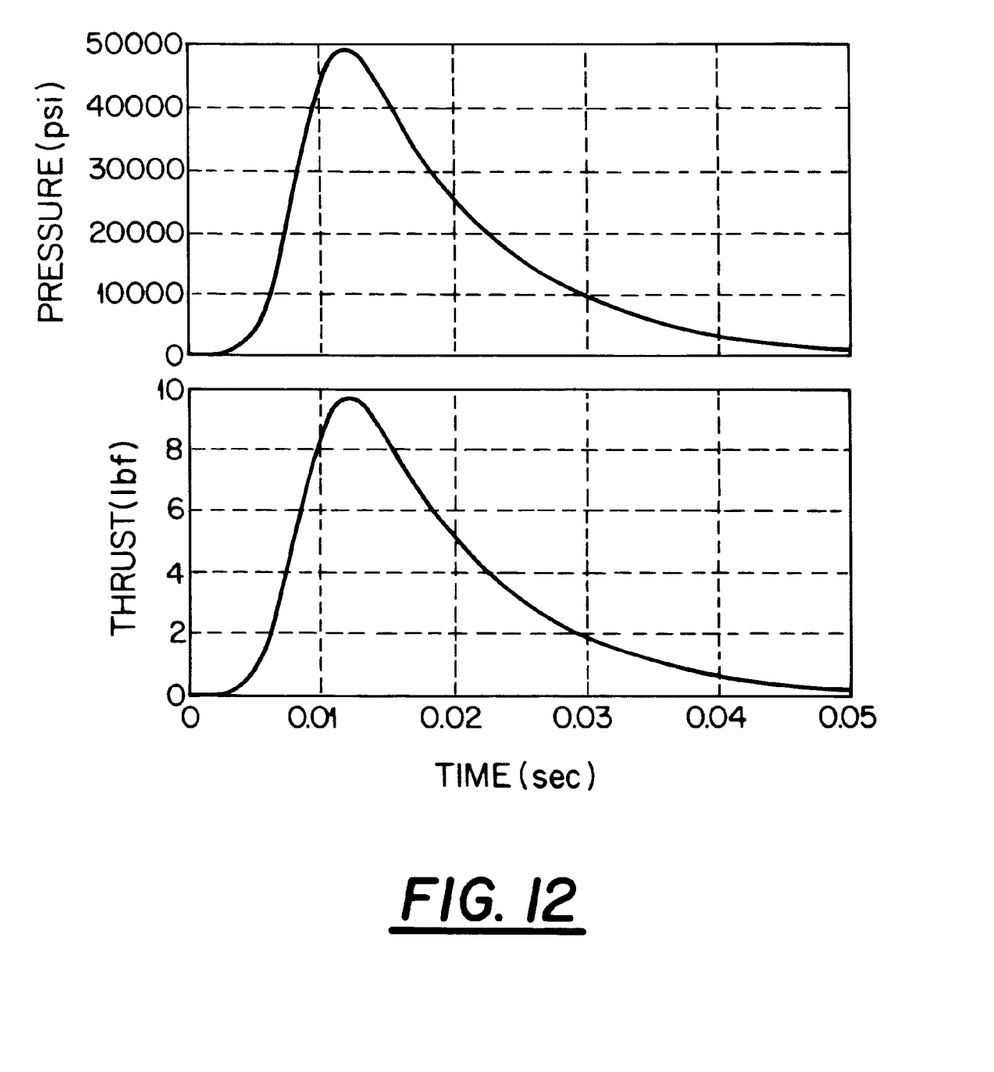
FIG. 12 provides diagrams similar to those of FIG. 11 for a second example of a device according to the invention.

Table 3 shows corresponding values for a 10-lbf thruster, while FIG. 12 shows the form of the pressure and thrust pulses that would be produced in a device according to the mathematical model of FIG. 10 and with the dimensions of Table 3.

TABLE 3

Geometry for 10-lbf Thruster

| | |
|---|---|
| Dimensions of cube | 0.2 in. × 0.2 in. × 0.2 in. |
| Initial free volume | 0.02 $in^3$ |
| Throat Diameter | 0.0113 in |
| Expansion Ratio | 500:1 |
| Vacuum Thrust Coeff. | 1.975 |

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method of producing a controlled combustion, comprising:
    placing a combustion chamber in communication with a feed chamber that contains a solid propellant body;
    introducing at least a portion of said solid propellant body into said combustion chamber;
    isolating said combustion chamber from said feed chamber; and
    igniting said solid propellant body in said combustion chamber while said combustion chamber is isolated from said feed chamber; wherein said acts of placing said combustion chamber in communication with said feed chamber and introducing at least a portion of said solid propellant body into said combustion chamber are carried out while said combustion chamber is isolated from an outlet nozzle or an accumulator.

2. The method of claim 1 wherein said act of isolating is carried out by displacing said combustion chamber from a first position in which said combustion chamber is in communication with said feed chamber to a second position in which said combustion chamber is isolated from said feed chamber.

3. The method of claim 2 wherein said combustion chamber is displaced from said first position to said second position over an arcuate or linear path.

4. The method of claim 3 wherein said arcuate or linear path is transverse to the direction of introduction of at least a portion of said body into said combustion chamber.

5. The method of claim 3 wherein said act of introducing comprises severing a portion of propellant material from said solid propellant body and introducing said severed portion into said combustion chamber.

6. The method of claim 5 further comprising repeating, in sequence, said acts of placing, introducing, isolating and igniting.

7. The method of claim 2 wherein said feed chamber contains a plurality of solid propellant bodies and said act of introducing comprises introducing one of said plurality of solid propellant bodies into said combustion chamber.

8. The method of claim 7 further comprising repeating, in sequence, said acts of placing, introducing, isolating and igniting.

9. The method of claim 1 wherein said act of igniting is carried out at a time when said combustion chamber is completely sealed or is in communication with one of said outlet nozzle and said accumulator.

10. The method of claim 1 wherein said act of igniting is carried out at a time when said combustion chamber is in communication with one of said outlet nozzle and said accumulator.

11. A device for producing a controlled combustion, comprising:
    at least one combustion chamber having a combustion gas outlet;
    a feed chamber containing a solid propellant;
    at least one outlet component constituted by one of a nozzle and an accumulator;
    an igniter communicating with said at least one combustion chamber; and
    control means coupled to one of said at least one combustion chamber and said feed chamber for establishing a first position in which said at least one combustion chamber is in communication with said feed chamber to allow at least a portion of said solid propellant to be introduced into said at least one combustion chamber, and a second position in which said at least one combustion chamber is isolated from said feed chamber and said combustion gas outlet is in communication with said at least one outlet component; wherein said control means are operative for isolating said at least one combustion chamber from said at least one outlet component in said first position.

12. The device of claim 11 wherein said control means are operative for displacing said at least one combustion chamber relative to said feed chamber over an arcuate or linear path between said first position and said second position.

13. The device of claim 12 wherein said arcuate or linear path is transverse to the direction of introduction of at least a portion of said solid propellant into said at least one combustion chamber.

14. The device of claim 12 wherein said solid propellant in said feed chamber is constituted by a single body of propellant, and said device further comprises means for severing a portion from said single body of propellant and introducing a severed portion of said single body of propellant into said at least one combustion chamber when said first position is established.

15. The device of claim 12 wherein said solid propellant is constituted by a plurality of bodies of propellant in said feed chamber, and wherein said device further comprises means for feeding one body into said at least one combustion chamber when said first position is established.

16. The device of claim 11 wherein said solid propellant in said feed chamber is constituted by a single body of propellant, and said device further comprises means for severing a portion from said single body of propellant and introducing a severed portion of said single body into said at least one combustion chamber when said first position is established.

17. The device of claim 11 wherein said solid propellant is constituted by a plurality of bodies of propellant in said feed chamber, and wherein said device further comprises means for feeding one body into said at least one combustion chamber when said first position is established.

18. The device of claim 11, further comprising a device housing fixed to said feed chamber and a combustion chamber housing containing said at least one combustion chamber, and wherein said at least one outlet component comprises a plurality of outlet components and said control means are operative to establish said second position with respect to any one of said plurality of outlet components.

19. The device of claim 18 wherein said at least one combustion chamber comprises a plurality of combustion chambers, each having a respective combustion gas outlet, and said control means are operative to establish said first position with respect to any one of said plurality of combustion chambers and said second position with respect to any one of said plurality of combustion chambers and said respective combustion gas outlet.

* * * * *

UNITED STATES PATENT AND TRADEMARK OFFICE
CERTIFICATE OF CORRECTION

PATENT NO. : 6,705,075 B1
DATED : March 16, 2004
INVENTOR(S) : Thomas K. Highsmith et al.

It is certified that error appears in the above-identified patent and that said Letters Patent is hereby corrected as shown below:

Column 3,
Line 6, delete the comma after "element"
Line 67, before "32" change "passage" to -- combustion gas outflow path --

Column 8,
Line 17, after "said" and before "body" insert -- solid propellant --

Signed and Sealed this

Second Day of August, 2005

JON W. DUDAS
*Director of the United States Patent and Trademark Office*